United States Patent Office 3,591,581
Patented July 6, 1971

---

3,591,581
4,5-EPOXY-1,3,4,5-TETRAHYDRO-2H-1,4-BENZODIAZEPIN-2-ONES
George Francis Field, West Caldwell, Robert Ye-Fong Ning, Verona, and Leo Henryk Sternbach, Upper Montclair, N.J., assignors to Hoffmann-La Roche Inc., Nutley, N.J.
No Drawing. Continuation-in-part of application Ser. No. 766,649, Oct. 10, 1968. This application June 23, 1969, Ser. No. 835,720
Int. Cl. C07d 53/06
U.S. Cl. 260—239.3          24 Claims

ABSTRACT OF THE DISCLOSURE 4,5-epoxy - 1,3,4,5 - tetrahydro-2H-1,4-benzodiazepin-2-ones are prepared by light irradiation of a correspondingly substituted 1,3-dihydro-2H-1,4-benzodiazepin-2-one 4-oxide. The epoxy compounds are useful as sedatives, muscle relaxants and anticonvulsant agents. These compounds have also exhibited antibacterial activity against certain specific organisms.

RELATED APPLICATIONS

This case is a continuation-in-part of co-pending U.S. application Ser. No. 766,649, filed Oct. 10, 1968, now abandoned.

DESCRIPTION OF THE INVENTION

The present invention relates to pharmacologically useful compounds of the following formula

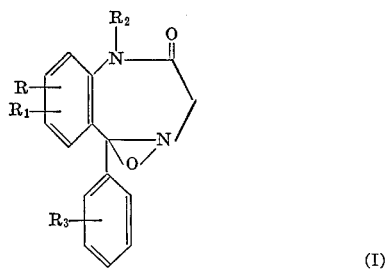

(I)

wherein R and $R_1$ independently each are hydrogen, halogen, trifluoromethyl, amino, lower alkylamino, nitro, lower alkyl, lower alkylthio, lower alkylsulfonyl and lower alkyl-sulfinyl; $R_2$ is hydrogen, lower alkyl, cycloalkyl, aryl alkyl and lower alkenyl and $R_3$ is hydrogen, halogen, trifluoromethyl and lower alkyl.

As used herein, the term "lower alkyl'" comprehends straight or branched chain hydrocarbon groups having from 1–7 carbon atoms, preferably 1–4 carbon atoms, such as methyl, ethyl, propyl, isopropyl or the like. The term "lower alkenyl" refers to both straight and branched chain unsaturated hydrocarbon groups such as allyl and the like. The term "cycloalkyl" comprehends a cyclic hydrocarbon group having from 3–6 carbon atoms in the ring, such as cyclopropyl, cyclobutyl, cyclopentyl and the like. "Halogen" represents all four halogens, i.e., fluorine, iodine, chlorine and bromine, with fluorine, chlorine and bromine the halogens of preference in the present invention. The term "arylalkyl" comprehends phenyl-lower alkyl groups such as benzyl.

In a preferred embodiment of the present invention, one member of R and $R_1$ represents a halogen group substituted at the 7-position of the benzodiazepine ring and the other is hydrogen. In a most preferred embodiment the halogen substituent is a chloro group. In such preferred embodiment, $R_2$ is hydrogen or lower alkyl, most preferably hydrogen or methyl. The meaning of $R_3$ in such preferred embodiment is hydrogen or halogen. When $R_3$ is halogen, it most preferably is substituted at the 2' or ortho position and in a most preferred embodiment is fluorine.

Compounds of Formula I are most conveniently prepared by irradiating a compound of the following formula

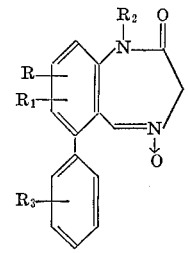

(II)

where R, $R_1$, $R_2$ and $R_3$ are as above.

The reaction described above proceeds by irradiation with light energy of a specific range of wavelengths which is obtained from a mercury arc lamp. A most preferred light source for the purpose of the irradiation used in the preparation of compounds of the present invention consists of a medium pressure mercury arc lamp which is fitted with a Pyrex filter sleeve to remove light of wavelengths less than about 300 m$\mu$. The resulting light beam will contain wavelengths substantially in the range between about 300 to about 400 m$\mu$ which light will be of sufficient energy to effect the desired irradiation reaction but will be below the energy levels which cause degradation of the compounds of Formula I.

The irradiation reaction is most conveniently conducted in an inert organic solvent conventionally employed in irradiation procedures. Suitable solvents include, for example, ethers such as tetrahydrofuran, esters, ketones, hydrocarbons and halogenated hydrocarbons. Tetrahydrofuran is a solvent of preference.

The subject reaction is conducted under an inert atmosphere such as for example a nitrogen, argon, helium, etc. atmosphere. The reaction temperature employed is not critical to this process and conventional temperatures useful in irradiation procedures can be used, such as for example, a temperature in the range of from about −70° to 150° C., most preferably in the range of from about 10 to 30° C.

Examples of compounds which correspond to Formula I and which are thus representative of the present invention include the following:

7-chloro-4,5-epoxy-5-phenyl-1,3,4,5-tetrahydro-2H-1,4-benzodiazepin-2-one 7-chloro-4,5-epoxy-1-methyl-5-phenyl-1,3,4,5-tetrahydro-2H-1,4-benzodiazepin-2-one 4,5-epoxy - 5 - phenyl - 1,3,4,5 - tetrahydro - 2H - 1,4-benzodiazepin-2-one.

7 - chloro - 5 - (2 - chlorophenyl) - 4,5-epoxy-1-methyl-1,3,4,5-tetrahydro-2H-1,4-benzodiazepin-2-one.

1 - benzyl - 7 - chloro - 4,5 - epoxy - 5 - phenyl - 1,3,4,5-tetrahydro-2H-1,4-denzodiazepin-2-one.

7,8 dimethyl - 4,5 - epoxy - 5 - phenyl - 1,3,4,5-tetrahydro-2H-1,4-benzodiazepin-2-one.

4,5 - epoxy - 5 - phenyl - 1,3,4,5 - tetrahydro-7-trifluoromethyl-2H-1,4-benzodiazepin-2-one.

7 chloro - 4,5 - epoxy - 5 - (2-fluorophenyl)-1,3,4,5-tetrahydro-2H-1,4-benzodiazepin-2-one.

7 - chloro - 5 - (2-chlorophenyl)-4,5-epoxy - 1,3,4,5-terahydro-2H-1,4-benzodiazepin-2-one.

4,5 - expoy - 5 - (2 - fluorophenyl) - 1,3,4,5 - tetrahydro-7-methylthio-2H-1,4-benzodiazepin-2-one.

4,5 epoxy - 7 - methylsulfonyl - 5 - phenyl - 1,3,4,5 - tetrahydro-2H-1,4-benzodiazepin-2-one.

4,5 - epoxy - 5 - phenyl - 1,3,4,5 - tetrahydro - 7 - methylthio-2H-1,4-benzodiazepin-2-one.

The compounds of Formula I are useful as pharmaceuticals and are characterized by activity as sedatives, muscle relaxants, and anti-convulsant agents. These compounds can be used in the form of conventional pharmaceutical preparations; for example, the aforesaid compounds can be mixed with conventional organic or inorganic, inert pharmaceutical carriers suitable for parenteral or enteral administration such as, for example, water, gelatin, lactose, starch, magnesium stearate, talc, vegetable oil, gums, or the like. They can be administered in conventional pharmaceutical forms, e.g., solid forms, for example, tablets, dragees, capsules, suppositories or the like; or in liquid forms, for example, suspensions, or emulsions. Moreover, the pharmaceutical compositions containing compounds of this invention can be subjected to conventional pharmaceutical expedients such as sterilization, and can contain conventional pharmaceutical excipients such as preservatives, stabilizing agents, emulsifying agents, salts for the adjustment of osmotic pressure or buffers. The compositions can also contain other therapeutically active materials.

A suitable pharmaceutical dosage unit can contain from about 1 to 500 mg. of the aforesaid compounds of Formula I. Suitable oral dosage regimens in warm-blooded mammals comprise from about 1 mg./kg. per day to about 500 mg./kg. per day. Suitable parenteral dosage regimens in warm-blooded mammals comprise from about 1 mg./kg. per day to about 500 mg./kg. per day. However, for any particular subject, the specific dosage regimen should be adjusted according to individual need and the professional judgment of the person administering or supervising the administration of the aforesaid compounds. It is to be understood that the dosages set forth herein are exemplary only and that they do not, to any extent, limit the scope or practice of this invention.

The muscle relaxant, sedative and anti-convulsant activity of a representative compound of the present invention, i.e., 7 - chloro-4,5-epoxy-5-phenyl-1,3,4,5-tetrahydro-2H-1,4-benzodiazepin-2-one was determined by using a series of biological screening tests. In the Foot Shock test (measuring the anti-anxiety and/or muscle relaxant activity) the subject compound had a 100% blocking dose of 20 mg./kg. p.o. Activity in the Inclined Screen test, (which measures muscle relaxant and/or sedative activity) for the subject compound was 150 mg./kg. p.o. ($PD_{50}$). A further muscle relaxant test is provided by the Unanesthetized Cat test wherein the compound of the present invention gave a minimum effective dose (MED) of 10 mg./kg. p.o. Anticonvulsive activity was determined by the Maxshock and Minshock tests wherein the compound had an $ED_{50}$ of 480 mg./kg. p.o. and 800 mg./kg. p.o., respectively. The Anti-metrazol test wherein and $ED_{50}$ of 32.7 mg./kg. p.o. was observed demonstrates in another mode the sedative and/or anti-convulsant activity of the subject compound.

The following examples are illustrative, but not limitative of this invention. All temperatures are in degrees centigrade.

EXAMPLE 1

Preparation of 7 - chloro - 4,5-epoxy-5-phenyl-1,3,4,5-tetrahydro-2H-1,4-benzodiazepin-2-one A solution of 26.8 g. (0.0935 mole) of 7-chloro-1,3,-dihydro-5-phenyl-2H-1,4-benzodiazepin-2-one 4-oxide in 1.4 liters of tetrahydrofuran was irradiated with a Hanovia 250 W medium pressure mercury arc (No. 654 A) through a Pyrex filter, under nitrogen atmosphere at 20° for 22 hours. The solution was concentrated in vacuo to a small volume. Addition of hexane and chilling gave the above-titled product as colorless prisms, melting with sudden decomposition in the temperature range of 136–150°. An analytical sample was prepared by recrystallizations from tetrahydrofuran methanol mixtures, M.P. 136° D.

EXAMPLE 2

Preparation of 7-chloro-4,5-epoxy-1-methyl-5-phenyl-1,3,4,5-tetrahydro-2H-1,4-benzodiazepin-2-one A solution of 30 g. (0.10 mole) of 7-chloro-1,3-dihydro-1-methyl-5-phenyl-2H-1,4-benzodiazepin-2-one 4-oxide in 1.4 liters of tetrahydrofuran was irradiated under the same conditions as described in Example 1. The irradiated solution was evaporated to dryness. Trituration of the residual gum with a small amount of ethanol caused crystallization of the above-titled product which was recrystallized once from ethanol to yield colorless prisms, M.P. 99–100°.

EXAMPLE 3

In a similar manner to the procedure described in Example 1, the following compounds of the Formula I were prepared.

TABLE I

| Name of compound | M.P., °C. (dec.)[1] | Recrystallization solvent [2] | Yield (percent) | THF solution irradiated [3] | Time (hrs.) |
|---|---|---|---|---|---|
| (a) 4,5-epoxy-5-phenyl-1,3,4,5-tetrahydro-2H-1,4-benzodiazepin-2-one | 159 | A | 96 | 2.0 g. in 1.4 l | 1.5 |
| (b) 7-chloro-5-(2-chlorophenyl)-4,5-epoxy-1-methyl-1,3,4,5-tetrahydro-2H-1,4-benzodiazepin-2-one | 119–121 | A | 61 | 0.50 g. in 150 ml | 1.5 |
| (c) 1-benzyl-7-chloro-4,5-epoxy-5-phenyl-1,3,4,5-tetrahydro-2H-1,4-benzodiazepin-2-one | 148–150 | C | 63 | do | 1.5 |
| (d) 7,8-dimethyl-4,5-eopxy-5-phenyl-1,3,4,5-tetrahydro-2H-1,4-benzodiazepin-2-one | 163 | C | 87 | do | 0.5 |
| (e) 4,5-epoxy-5-phenyl-1,3,4,5-tetrahydro-7-trifluoromethyl-2H-1,4-benzodiazepin-2-one | 128–131 | C | 80 | 1.0 g. in 150 ml | 0.5 |
| (f) 7-chloro-4,5-epoxy-5-(2-fluorophenyl)-1,3,4,5-tetrahydro-2H-1,4-benzodiazepin-2-one | 139 | C | 80 | 20 g. in 1.4 l | 19 |
| (g) 7-chloro-5-(2-chlorophenyl)-4,5-epoxy-1,3,4,5-tetrahydro-2H-1,4-benzodiazepin-2-one | 127 | C | 55 | do | 30 |
| (h) 4,5-epoxy-5-(2-fluorophenyl)-,3-4,5-tetrahydro-7-methylthio-2H-1,4-benzodiazepin-2-one | 126 | A | 96 | 0.50 g. in 150 ml | 0.25 |
| (i) 4,5-epoxy-7-methylsulfonyl-5-phenyl-1,3,4,5-tetrahydro-2H-1,4-benzodiazepin-2-one.[4] | 165 | A | 88 | 0.60 g. in 1.4 l | 0.75 |
| (j) 4,5-epoxy-5-phenyl-1,3,4,5-tetrahydro-7-methylthio-2H-1,4-benzodiazepin-2-one | 128 | A | 82 | 0.50 g. in 150 ml | 0.25 |

[1] Characterized by sudden decompositions; sometimes variable with the rate of heating.
[2] A–THF-hexane; B-EtOH; C=$C_6H_6$-n-heptane.
[3] Irradiation performed under an atmosphere of nitrogen gas, with a 250 w. Hanovia mercury lamp #654A, filtered through a Pyrex sleeve inside a quartz immersion well, cooled by running tap water.
[4] The starting material for this experiment may be prepared as follows: A solution of 11.28 g. (40 mmoles) of 1,3-dihydro-7-methylthio-4-phenyl-2H-1,4-benzodiazepin-2-one and 32.6 g. (160 mmoles) of m-chloroperbenzoic acid in 800 ml. $CH_2Cl_2$ was allowed to stand at room temperature. After 18 hours, the precipitated solids were collected and combined with two more crops of solids obtained from concentration of the $CH_2Cl_2$ solution. The solids were suspended in excess aqueous $NaHCO_3$ and $H_2O$ followed by drying weighed 6.0 g. After two recrystallizations from DMF-EtOH: 5.14 g. of 1,3-dihydro-7-methylsulfonyl-4-phenyl-2H-1,4-benzodiazepin-2-one 4-oxide was obtained in a colorless amorphous form, M.P. 256–257° (dec.).

EXAMPLE 4

| Suppository formulation: | Per 1.3 gm. Suppository, gm. |
|---|---|
| 7-chloro - 4,5 - epoxy - 5 - phenyl-1,3,4,5- tetrahydro-2H-1,4-benzodiazepin-2-one | 0.010 |
| Wecobee M [1] | 1.245 |
| Carnauba wax | 0.045 |

[1] E. F. Drew Company, 522 Fifth Ave., New York, N.Y.

Procedure (1) The Wecobee M and the carnauba wax were melted in a suitable size glass-lined container (stainless steel may also be used), mixed well and cooled to 45° C.

(2) 7-chloro - 4,5 - epoxy - 5 - phenyl-1,3,4,5-tetrahydro-2H-1,4-benzodiazepin - 2 - one which had been reduced to a fine powder with no lumps, was added and stirred until completely and uniformly dispersed.

(3) The mixture was poured into suppository molds to yield suppositories having an individual weight of 1.3 grams.

(4) The suppositories were cooled and removed from molds. They were then individually wrapped in wax paper for packaging (foil may also be used).

EXAMPLE 5

Capsule formulation:            Per capsule, mg.
7-chloro - 4,5 - epoxy - 5 - phenyl-1,3,4,5-tetrahydro-2H-1,4-benzodiazepin-2-one _____ 10
Lactose, U.S.P. _____ 165
Corn starch, U.S.P. _____ 30
Talc, U.S.P. _____ 5

Total weight _____ 210

Procedure (1) 7-chloro - 4,5 - epoxy - 5 - phenyl-1,3,4,5-tetrahydro-2H-1,4-benzodiazepin - 2 - one, lactose and corn starch were mixed in a suitable mixer.

(2) The mixture was further blended by passing through a Fitzpatrick Comminuting Machine with a No. 1A screen with knives forward.

(3) The blended powder was returned to the mixer, the talc added and blended thoroughly.

(4) The mixture was filled into No. 4 hard shell gelatin capsules on a Parke Davis capsulating machine (any similar type capsulating machine may be used).

EXAMPLE 6

Tablet formulation:            Per tablet, mg.
7-chloro - 4,5 - epoxy-5-phenyl-1,3,4,5-tetrahydro-2H-1,4-benzodiazepin-2-one _____ 25.00
Dicalcium phosphate dihydrate, unmilled ___ 175.00
Corn starch _____ 24.00
Magnesium stearate _____ 1.00

Total weight _____ 225.00

Procedure (1) 7-chloro - 4,5 - epoxy - 5 - phenyl-1,3,4,5-tetrahydro-2H-1,4-benzodiazepin - 2 - one and corn starch were mixed together and passed through a No. 00 screen in Model "J" Fitzmill with hammers forward.

(2) This premix was then mixed with dicalcium phosphate and one-half of the magnesium stearate, passed through a No. 1A screen in Model "J" Fitzmill with knives forward, and slugged.

(3) The slugs were passed through a No. 2A plate in a Model "D" Fitzmill at slow speed with knives forward, and the remaining magnesium stearate was added.

(4) The mixture was mixed and compressed.

What is claimed is:

1. A compound of the formula

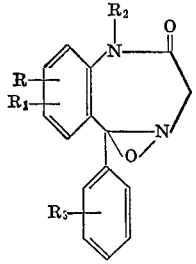

wherein R and $R_1$ independently each are hydrogen, halogen, trifluoromethyl, amino, lower alkylamino, nitro, lower alkyl, lower alkylthio, lower alkylsulfonyl and lower alkylsulfinyl; $R_2$ is hydrogen, lower alkyl, cycloalkyl containing from 3–6 carbon atoms, phenyl-lower alkyl and lower alkenyl and $R_3$ is hydrogen, halogen, trifluoromethly, and lower alkyl.

2. A compound of claim 1 wherein R is hydrogen and $R_1$ is halogen substituted at the 7-position of the benzodiazepine ring.

3. A compound of claim 2 wherein $R_1$ is chlorine and $R_2$ is lower alkyl.

4. A compound of claim 3 wherein $R_2$ is methyl.

5. A compound of claim 3 wherein $R_3$ is hydrogen.

6. A compound of claim 3 wherein $R_1$ is chlorine and R is hydrogen.

7. The compound of claim 6 which is 7-chloro-4,5-epoxy-5-phenyl-1,3,4,5-tetrahydro-2H-1,4 - benzodiazepin-2-one.

8. The compound of claim 4 which is 7-chloro-4,5-epoxy-1-methyl - 5 - phenyl - 1,3,4,5 - tetrahydro-2H-1,4-benzodiazepin-2-one.

9. The compound of claim 1 which is 4,5-epoxy-5-phenyl-1,3,4,5-tetrahydro-2H-1,4-benzodiazepin-2-one.

10. The compounds of claim 1 wherein $R_3$ is halogen.

11. A compound of claim 10 which is 7-chloro-5-(2-chlorophenyl)-4,5-epoxy-1-methyl - 1,3,4,5 - tetrahydro-2H-1,4-benzodiazepin-2-one.

12. The compound of claim 10 which is 7-chloro-4,5-epoxy-5-(2-fluorophenyl) - 1,3,4,5 - tetrahydro - 2H-1,4-benzodiazepin-2-one.

13. The compound of claim 10 which is 7-chloro-5-(2-chlorophenyl)-4,5-epoxy-1,3,4,5 - tetrahydro - 2H - 1,4-benzodiazepin-2-one.

14. The compound of claim 10 which is 4,5-epoxy-5-(2-fluorophenyl)-1,3,4,5-tetrahydro - 7 - methylthio - 2H-1,4-benzodiazepin-2-one.

15. A compound of claim 1 wherein $R_2$ is phenyl-lower alkyl.

16. The compound of claim 15 which is 1-benzyl-7-chloro-4,5-epoxy - 5 - phenyl - 1,3,4,5-tetrahydro-2H-1,4-benzodiazepin-2-one.

17. A compound of claim 1 wherein R and $R_1$ are both lower alkyl.

18. The compound of claim 17 which is 7,8-dimethyl-4,5-epoxy-5-phenyl - 1,3,4,5 - tetrahydro - 2H-1,4-benzodiazepin-2-one.

19. The compound of claim 1 which is 4,5-epoxy-5-phenyl-1,3,4,5-tetrahydro - 7 - trifluoromethyl - 2H - 1,4-benzodiazepin-2-one.

20. The compound of claim 1 which is 4,5-epoxy-5-phenyl-1,3,4,5-tetrahydro - 7 - methylthio - 2H - 1,4-benzodiazepin-2-one.

21. A process for the preparation of compound of the formula

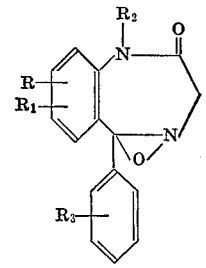

wherein R and $R_1$ are each independently hydrogen, halogen, trifluoromethyl, amino, lower alkylamino, nitro, lower alkyl, lower alkylthio, lower alkylsulfonyl and lower alkylsulfinyl; $R_2$ is hydrogen, lower alkyl, cycloalkyl containing from 3–6 carbon atoms, phenyl-lower alkyl and lower alkenyl; and $R_3$ is hydrogen, halogen, trifluoromethyl and lower alkyl which process comprises irradiating a compound of the formula

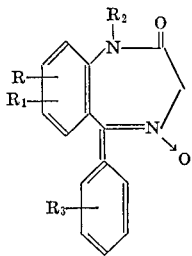

wherein R, $R_1$, $R_2$ and $R_3$ are as above with light energy having a major portion of its energy in the range between about 300 to 400 m$\mu$.

22. The process of claim 21 wherein said light energy is derived from a medium pressure mercury arc lamp.

23. The process of claim 22 wherein said desired light energy range is obtained by filtering the light through a Pyrex filter.

24. A compound of claim 1 which is 4,5-epoxy-7-methyl-sulfonyl-5-phenyl - 1,3,4,5 - tetrahydro - 2H - 1,4-benzodiazepin-2-one.

References Cited

Sternbach et al., "J. Org. Chem." vol. 27, pp. 4671–2 (1962).

HENRY R. JILES, Primary Examiner

R. T. BOND, Assistant Examiner

U.S. Cl. X.R.

204—158; 260—239.3; 424—244

PO-1050
(5/69)

UNITED STATES PATENT OFFICE
CERTIFICATE OF CORRECTION

Patent No. 3,591,581      Dated July 6, 1971

Inventor(s) Field, Ning and Sternbach

It is certified that error appears in the above-identified patent and that said Letters Patent are hereby corrected as shown below:

Column 2 lines 6-15 in formula II

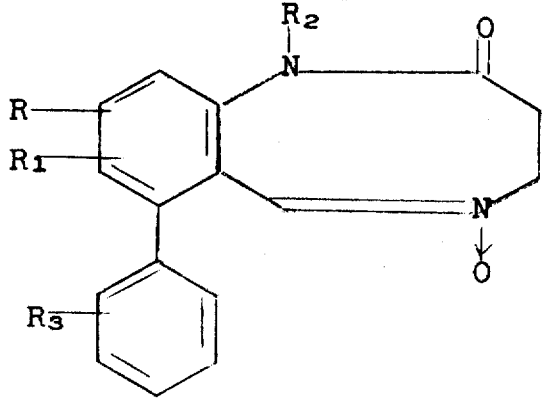

should be

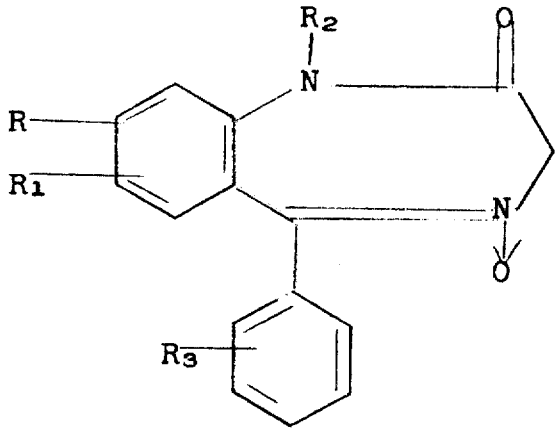

| | UNITED STATES PATENT OFFICE |
|---|---|
| PO-1050 (5/69) | CERTIFICATE OF CORRECTION |

Patent No. 3,591,581      Dated _____

Inventor(s)    Field, Ning and Sternbach

It is certified that error appears in the above-identified patent and that said Letters Patent are hereby corrected as shown below:

Column 6 line 25   claim 10

"The compound"     should be     A compound

Column 6, line 26   claim 11

"A compound"     should be     The compound

Column 6 line 54   claim 21

"A process for the preparation of compound "

should be

A process for the preparation of a compound

PO-1050
(5/69)

UNITED STATES PATENT OFFICE
CERTIFICATE OF CORRECTION

Patent No. 3,591,581          Dated

Inventor(s)  Field, Ning and Sternbach

It is certified that error appears in the above-identified patent and that said Letters Patent are hereby corrected as shown below:

Column 7, lines 4-13 in claim 21

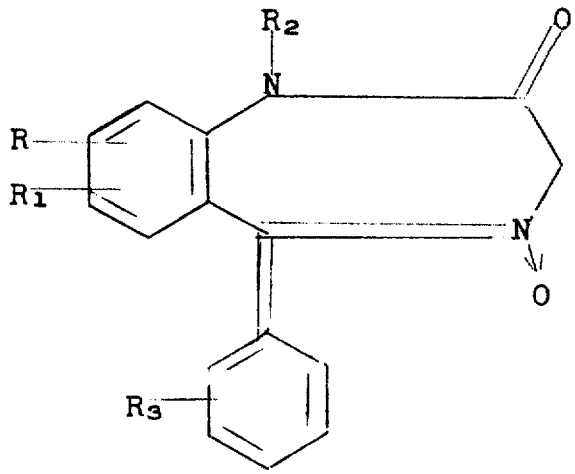

should be

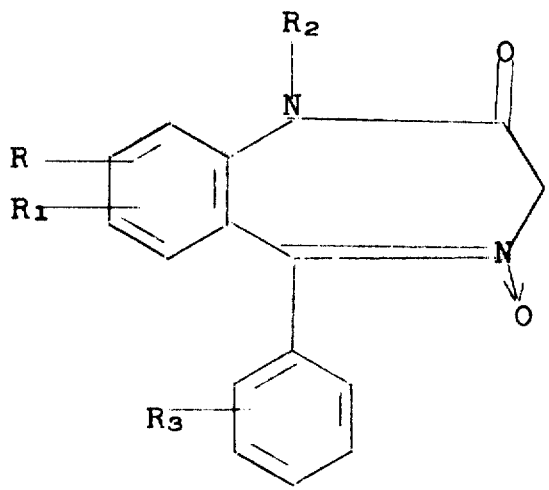

Signed and sealed this 9th day of May 1972.

(SEAL)
Attest:

EDWARD M. FLETCHER, JR.
Attesting Officer

ROBERT GOTTSCHALK
Commissioner of Patents